United States Patent
Taniguchi

(10) Patent No.: US 9,225,047 B2
(45) Date of Patent: Dec. 29, 2015

(54) FUEL CELL DEVICE

(75) Inventor: Eiji Taniguchi, Moriyama (JP)

(73) Assignee: KYOCERA CORPORATION, Kyoto-Shi, Kyoto (JP)

(*) Notice: Subject to any disclaimer, the term of this patent is extended or adjusted under 35 U.S.C. 154(b) by 94 days.

(21) Appl. No.: 14/123,060

(22) PCT Filed: May 30, 2012

(86) PCT No.: PCT/JP2012/064009
§ 371 (c)(1),
(2), (4) Date: Dec. 30, 2013

(87) PCT Pub. No.: WO2012/165516
PCT Pub. Date: Dec. 6, 2012

(65) Prior Publication Data
US 2014/0120382 A1 May 1, 2014

(30) Foreign Application Priority Data

May 30, 2011 (JP) .................. 2011-120655

(51) Int. Cl.
*H01M 16/00* (2006.01)
*H01M 8/04* (2006.01)
*H01M 8/06* (2006.01)

(52) U.S. Cl.
CPC ........ *H01M 16/006* (2013.01); *H01M 8/04014* (2013.01); *H01M 8/04223* (2013.01); *H01M 8/04731* (2013.01); *H01M 8/04955* (2013.01); *H01M 8/04985* (2013.01); *H01M 8/04067* (2013.01); *H01M 8/0618* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2004/0241512 A1* | 12/2004 | Muto et al. | 429/23 |
| 2005/0281735 A1* | 12/2005 | Chellappa et al. | 423/648.1 |
| 2006/0057445 A1* | 3/2006 | Kabasawa | 429/22 |
| 2007/0178361 A1* | 8/2007 | Brantley et al. | 429/38 |
| 2008/0152974 A1* | 6/2008 | Murabayashi | 429/23 |

(Continued)

FOREIGN PATENT DOCUMENTS

| | | |
|---|---|---|
| JP | 6152173 A | 3/1986 |
| JP | 8-148173 | 6/1996 |

(Continued)

OTHER PUBLICATIONS

The European Search Report dated Oct. 24, 2014 issued in the corresponding European patent application No. 12793211.9.

(Continued)

*Primary Examiner* — Patrick Ryan
*Assistant Examiner* — Wyatt McConnell

(57) ABSTRACT

A fuel cell includes a fuel cell, auxiliaries, a storage battery, an auxiliary power switching unit and a controlling device. The fuel cell is connected to a system power supply. The auxiliaries are coupled to the fuel cell. The auxiliary power switching unit switches power supplies to at least one of the auxiliaries from the storage battery. When the fuel cell device that is not operating starts operation at a time of power failure of the system power supply, the controlling device determines whether or not each of the auxiliaries need power for startup of the fuel cell and prompts the auxiliary power switching unit to supply the power from the storage battery to one or more auxiliaries for which the controlling device has determined a power demand for the startup.

9 Claims, 4 Drawing Sheets

(56) References Cited

U.S. PATENT DOCUMENTS

| | | | |
|---|---|---|---|
| 2009/0081492 A1* | 3/2009 | Hasuka et al. | 429/13 |
| 2010/0068565 A1* | 3/2010 | Yadha et al. | 429/13 |
| 2010/0167154 A1 | 7/2010 | Ono | |
| 2012/0028143 A1 | 2/2012 | Akagi et al. | |

FOREIGN PATENT DOCUMENTS

| | | |
|---|---|---|
| JP | 2003-93228 | 4/2003 |
| JP | 200393228 A | 4/2003 |
| JP | 2004-192889 | 7/2004 |
| JP | 2004192889 A | 7/2004 |
| JP | 2004316535 A | 11/2004 |
| JP | 2007-59377 | 3/2007 |
| JP | 2007-80731 | 3/2007 |
| JP | 2007-80731 A | 3/2007 |
| JP | 200759377 A | 3/2007 |
| JP | 2007-207661 | 8/2007 |
| JP | 2007207661 | 8/2007 |
| JP | 2007207661 A | 8/2007 |
| JP | 2007-228728 | 9/2007 |
| JP | 2007228728 A | 9/2007 |
| JP | 2008-22650 | 1/2008 |
| JP | 200822650 A | 1/2008 |
| JP | 2008-269908 | 11/2008 |
| JP | 2010-238471 | 10/2010 |
| JP | 2010-238623 | 10/2010 |
| JP | 2010238471 A | 10/2010 |
| JP | 2010238623 | 10/2010 |
| JP | 2010282727 A | 12/2010 |
| JP | 201238559 A | 2/2012 |
| WO | 2007097314 A1 | 8/2007 |
| WO | 2009126692 A1 | 10/2009 |

OTHER PUBLICATIONS

English Translation of International Search Report issued in PCT/JP2012/064009 dated Aug. 29, 2012.

* cited by examiner (a)

(b)

FUEL CELL DEVICE

CROSS-REFERENCE TO RELATED APPLICATIONS

This application is a national phase of the International application PCT/JP2012/064009 filed May 30, 2012 that claims priority from the Japanese patent application JP2011-120655 filed May 30, 2011. The content of these aforementioned documents is herewith incorporated by reference.

TECHNICAL FIELD OF THE INVENTION

The present invention relates to a fuel cell device that is capable of being started up even if there is no power supply from a system power supply.

BACKGROUND OF THE INVENTION

In recent years, as next-generation energy, various fuel cell modules in which fuel cells are accommodated in storage containers and fuel cell devices in which such fuel cell modules are accommodated in exterior cases have been proposed (refer to, for example, Japanese Unexamined Patent Application Publication No. 2007-59377). Fuel cells are formed so as to be capable of obtaining power by using a fuel gas (hydrogen containing gas) and an oxygen containing gas (air).

In fuel cell devices that are expected to provide next-generation energy, many of the auxiliaries such as pumps for supplying, for example, a fuel gas or an oxygen containing gas to fuel cell modules are an electrically operated type that operates using power. Therefore, for example, when, at the time of power failure of a system power supply, the operation of a fuel cell device is temporarily stopped, the fuel cell device cannot be started up until the power is restored after the temporary stoppage.

Therefore, hitherto, when a fuel cell device that is not operating is to be started up at the time of power failure of a system power supply, for example, using a large capacity storage battery, power is supplied to all auxiliaries for operation thereof, and startup is performed (refer to, for example, Patent Literatures 2, 3, and 4).

The following is a list of the aforementioned background art

PTL 1: Japanese Unexamined Patent Application Publication No. 2007-59377

PTL 2: Japanese Unexamined Patent Application Publication No. 2007-207661

PTL 3: Japanese Unexamined Patent Application Publication No. 2008-22650

PTL 4: Japanese Unexamined Patent Application Publication No. 2008-269908

However, in the fuel cell devices described in the aforementioned Japanese Unexamined Patent Application Publication No. 2007-207661 to Japanese Unexamined Patent Application Publication No. 2008-269908, since power is supplied to all of the auxiliaries for operation thereof, it is necessary to perform startup using a large capacity storage battery. This increases the size and cost of the fuel cell devices.

It is an object of the present invention to provide a small, inexpensive fuel cell device that is capable of being started up even if there is no power supply from a system power supply.

A fuel cell device according to the present invention includes a fuel cell that is connected to a system power supply and that generates power using a fuel gas and an oxygen containing gas, a plurality of auxiliaries used for the power generation of the fuel cell, a storage battery, an auxiliary power switching unit that switches power supplies to the respective auxiliaries from the storage battery, and a controlling device that controls the auxiliary power switching unit, wherein, when the fuel cell device that is not operating is to be started up at a time of power failure of the system power supply, the controlling device determines whether or not each of the plurality of auxiliaries is an auxiliary necessary for startup of the fuel cell or an auxiliary unnecessary for the startup and controls the auxiliary power switching unit in such a way as to supply the power from the storage battery to the auxiliary necessary for the startup.

ADVANTAGEOUS EFFECTS OF INVENTION

The present invention can provide a small, inexpensive fuel cell device which, when the fuel cell device that is not operating is to be started up at the time of power failure of a system power supply, does not require a large capacity storage battery, is capable of being started up using a small storage battery, and is capable of being started up even if there is no power supply from the system power supply.

DETAILED DESCRIPTION OF THE DRAWINGS

Figure 1:
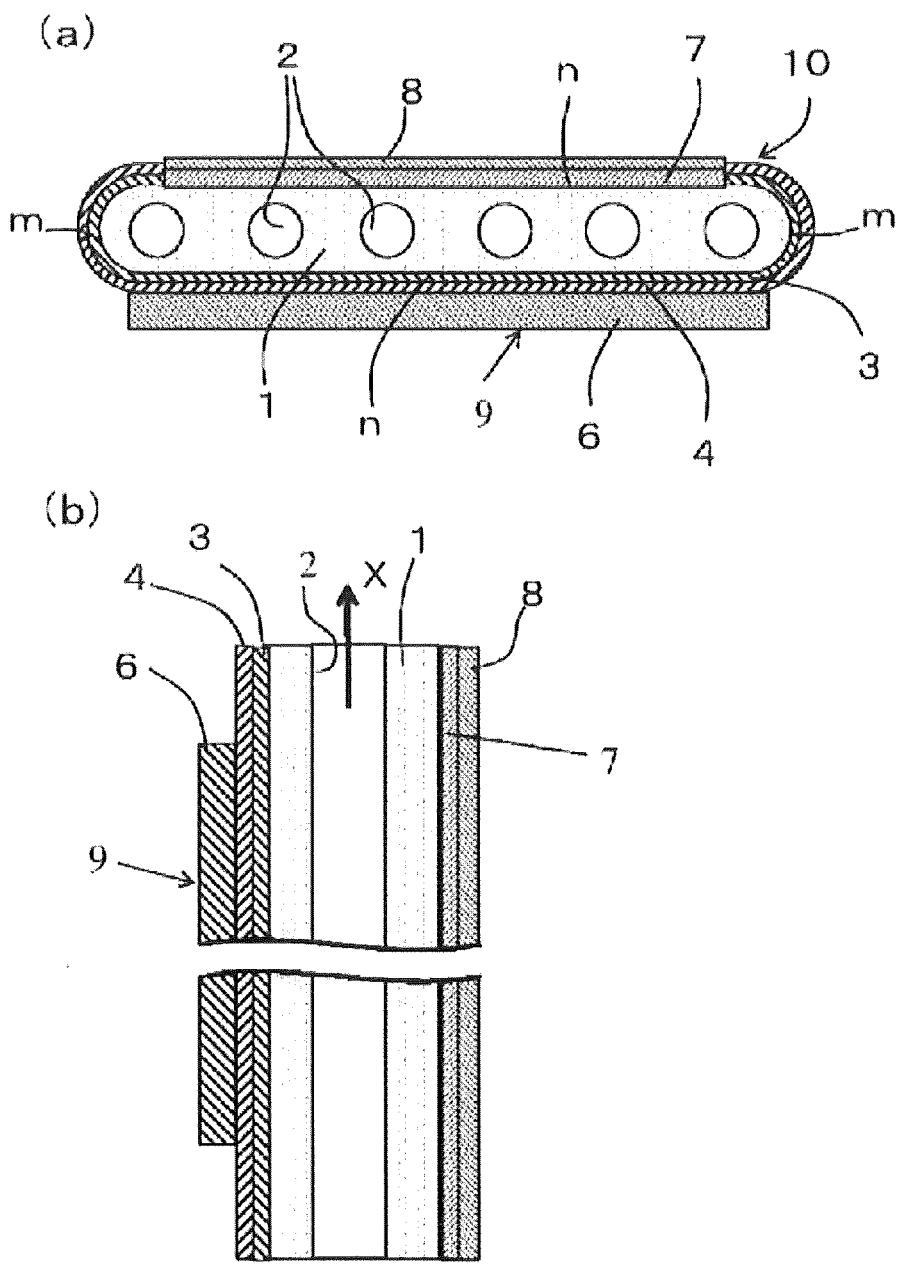
FIG. 1 illustrates a structure of an embodiment of a fuel cell system including a power generating unit and a hot water storage unit.

FIG. 1 illustrates a structure of an embodiment of a fuel cell system including a fuel cell device. FIG. 1 shows a case in which fuel cells of a solid oxide type are used as the fuel cell device. In the description below, solid oxide type fuel cells are used as an exemplification of fuel cells. It is possible to provide a fuel cell device that uses solid polymer fuel cells as fuel cells, in which case the structure of the fuel cell device is changed as appropriate in accordance with the solid polymer fuel cells.

The fuel cell system shown in FIG. 1 includes a power generating unit which includes the fuel cell device, a hot water storage unit which stores hot water after heat exchange, and a circulation pipe 15 for circulating water between these units. The power generating unit and the hot water storage unit are indicated by being surrounded by alternate long and short dashed lines, respectively, in FIG. 1.

The power generating unit, which corresponds to the fuel cell device, shown in FIG. 1 includes cell stacks 5; a raw fuel supplying device 1 which supplies a raw fuel, such as a town gas; an oxygen containing gas supplying device 2 for supplying an oxygen containing gas to the cell stacks 5; and a reforming unit 3 that reforms the raw fuel using a raw fuel and an oxygen containing gas or water vapor. The raw fuel supplying device 1 includes an electrically operated pump. A raw fuel, such as a town gas or propane gas, is supplied to the reforming unit 3 by this pump. The oxygen containing gas supplying device 2 includes an electrically operated blower. An oxygen containing gas, such as air, is supplied to the cell stacks 5 by this blower.

Figure 2:
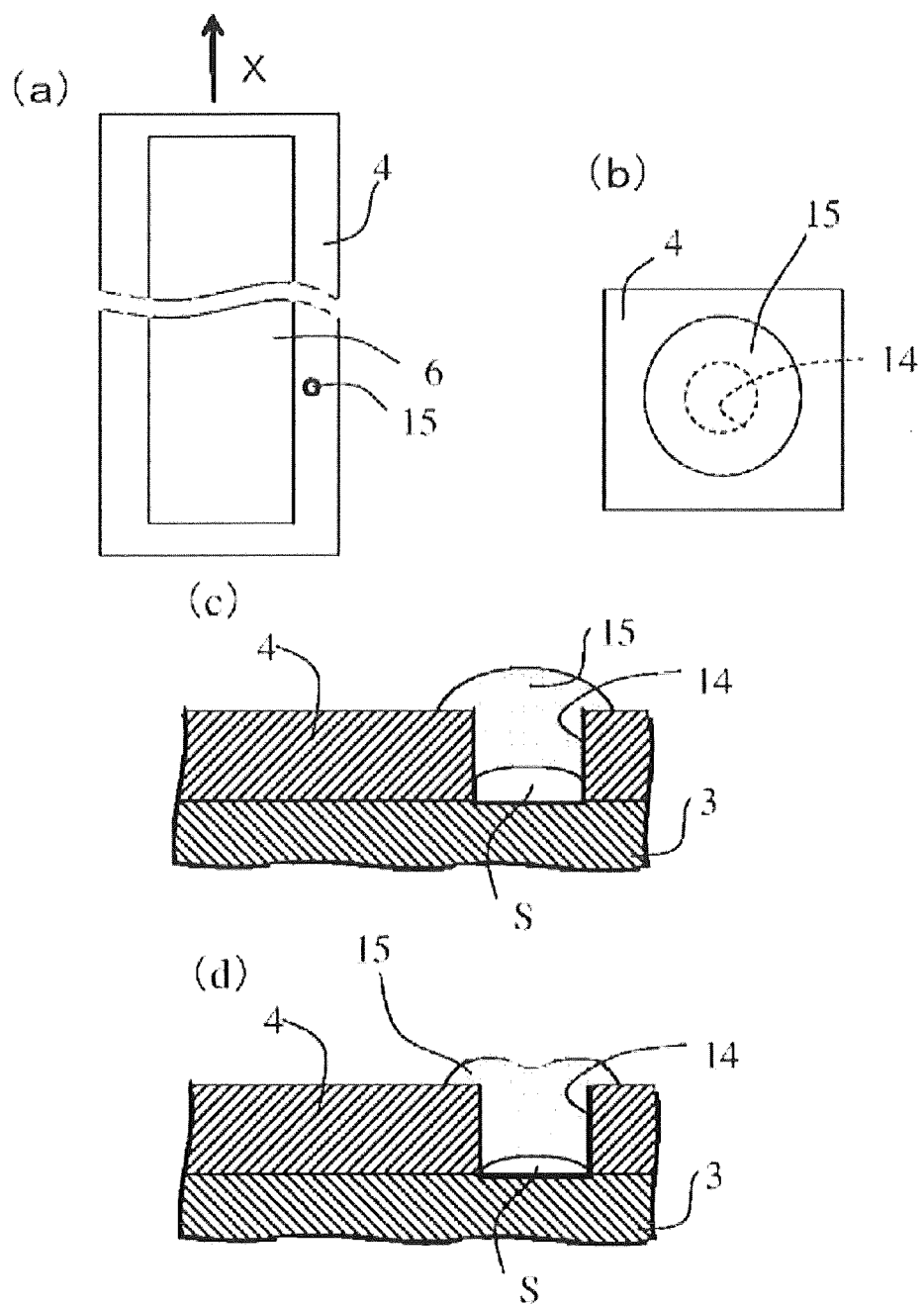
FIG. 2 is an external perspective view of a fuel cell module.
Figure 3:
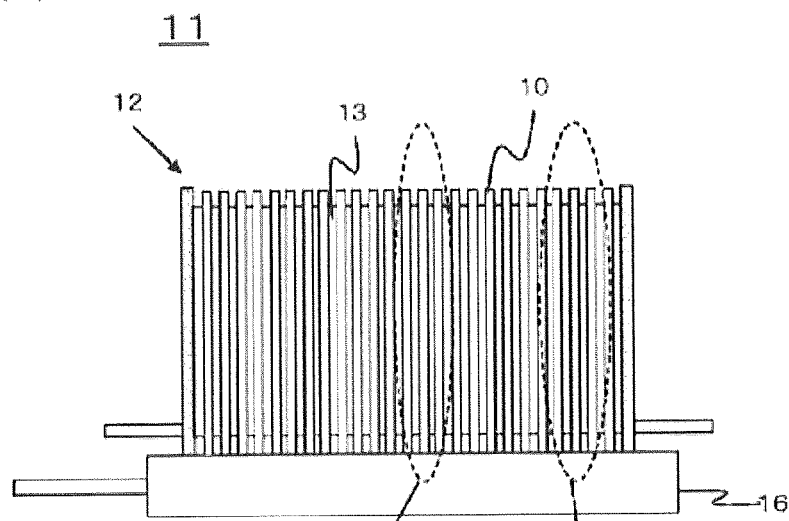
FIG. 3 is a sectional view of the fuel cell module shown in FIG. 2.
Figure 3:
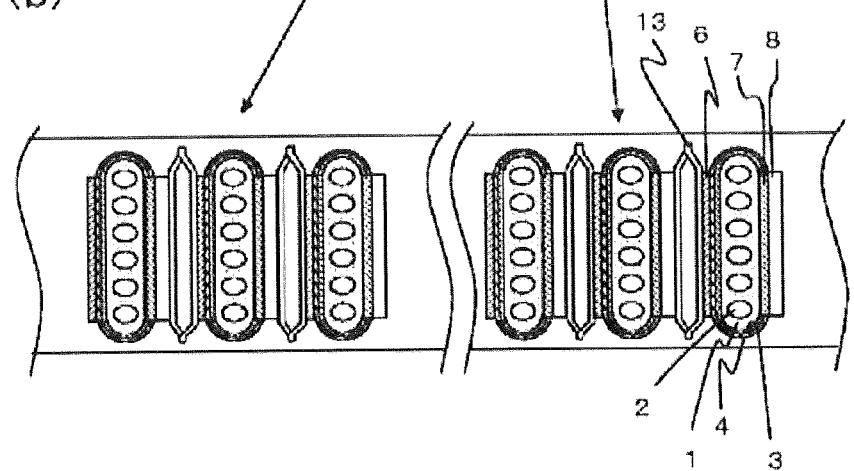

A valve 20 is provided between the oxygen containing gas supplying device 2 and the reforming unit 3 and the oxygen containing gas supply device 2 and the cell stacks 5. Although described later, a fuel cell module 4 (hereunder may be called "module") such as that shown in FIGS. 2 and 3 is formed by accommodating the cell stacks 5 and the reforming unit 3 in a storage container. In FIG. 1, the module 4 is indicated by being surrounded by an alternate long and two short dashes line.

In the power generating unit shown in FIG. 1, a condensed water treatment device 9 for treating condensed water, generated by a heat exchanger 8, and a water tank 11 for storing water (pure water), obtained by the treatment by the condensed water treatment device 9, are provided. The water tank 11 and the heat exchanger 8 are connected to each other by a condensed water supply pipe 10. The heat exchanger 8 of the power generating unit and a hot water storage tank 16 of the hot water storage unit are connected to each other by the circulation pipe 15 for circulating water. The heat exchanger 8 is formed so that heat exchange is performed between the water of the hot water storage unit and an exhaust gas (exhaust heat) generated by power generation at the cell stacks 5 of the power generating unit.

Depending upon the water quality of the condensed water that is generated by the heat exchange at the heat exchanger 8, it is possible not to provide the condensed water treatment device 9. When the condensed water treatment device 9 is capable of storing water, it is possible not to provide the water tank 11.

The water tank 11 and the reforming unit 3 are connected to each other by a water supply pipe 13. A water pump 12, which is a water supplying device, is provided in the water supply pipe 13 and is formed so that water stored in the water tank 11 is supplied to the reforming unit 3 by the water pump 12.

Figure 4:
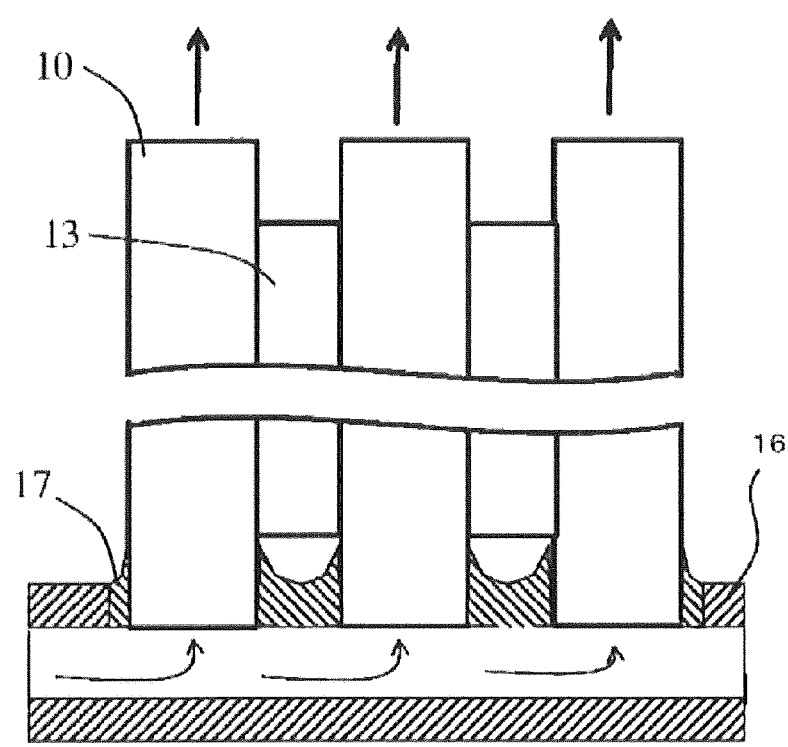
FIG. 4 is an exploded perspective schematic view of the fuel cell device.
Figure 1:
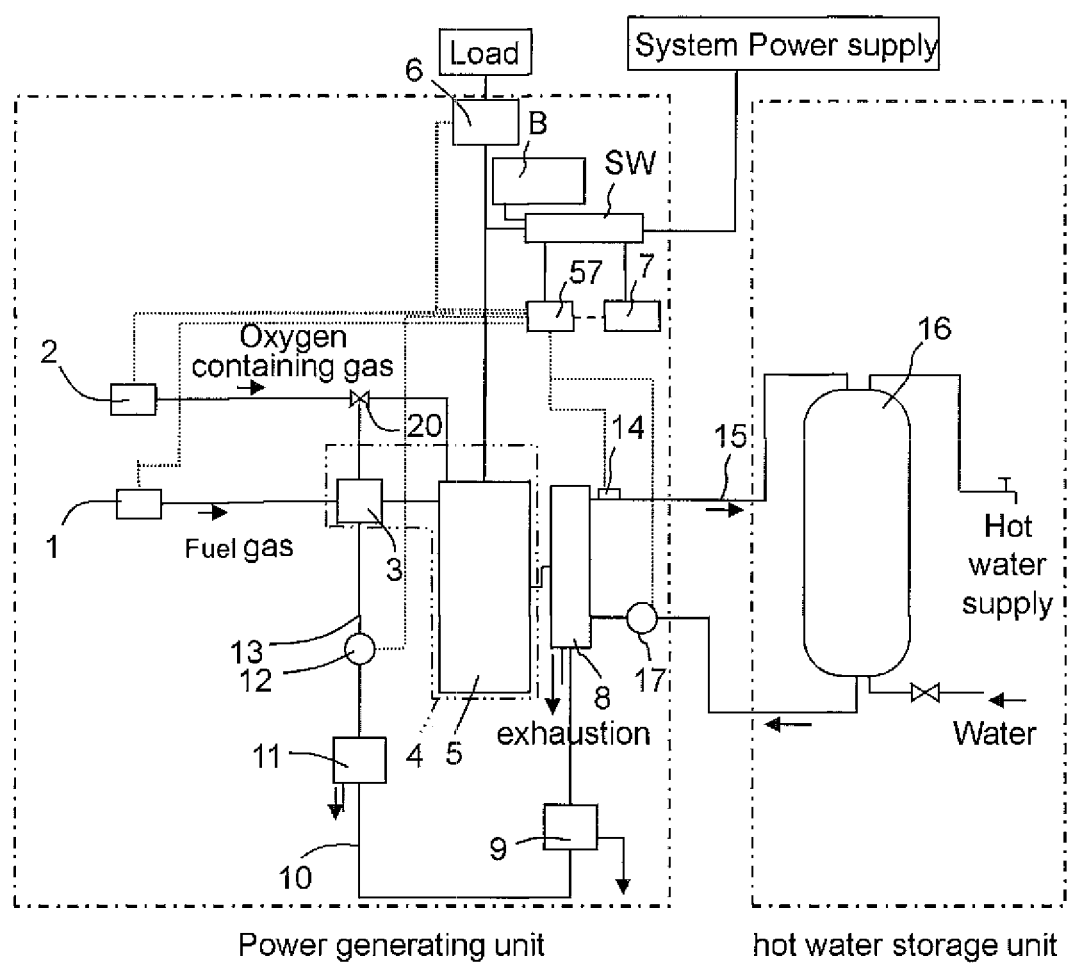
Figure 2:
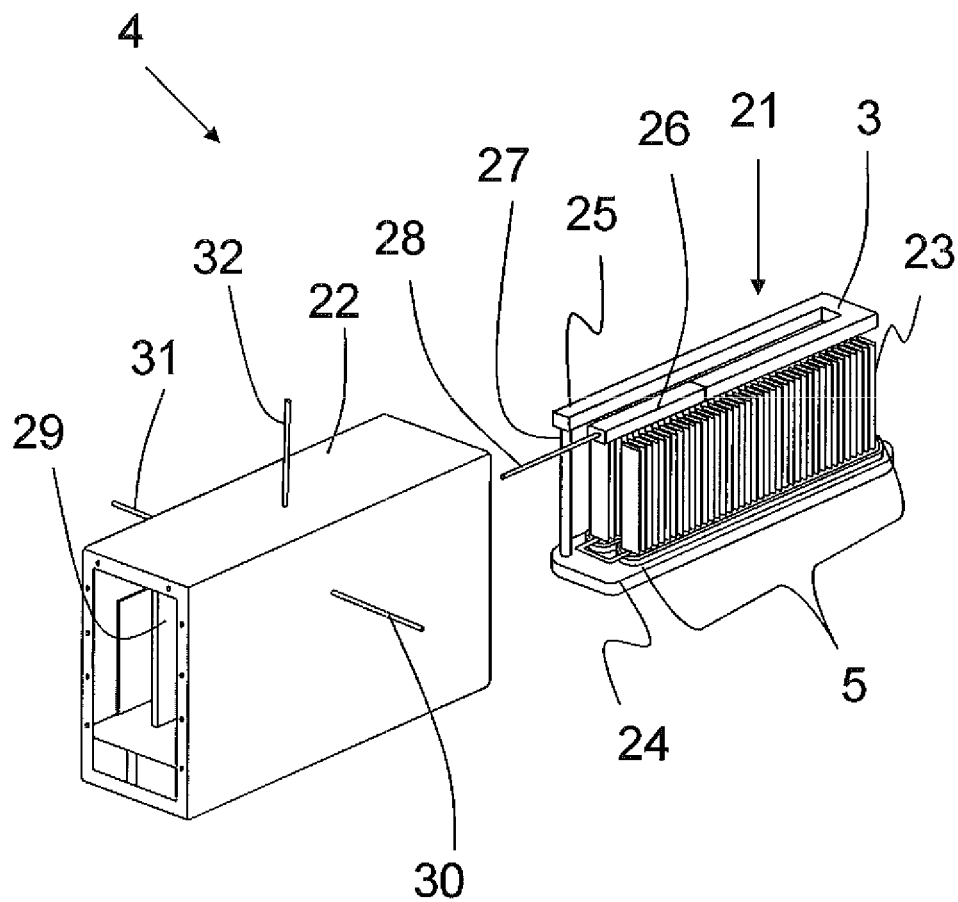
Figure 3:
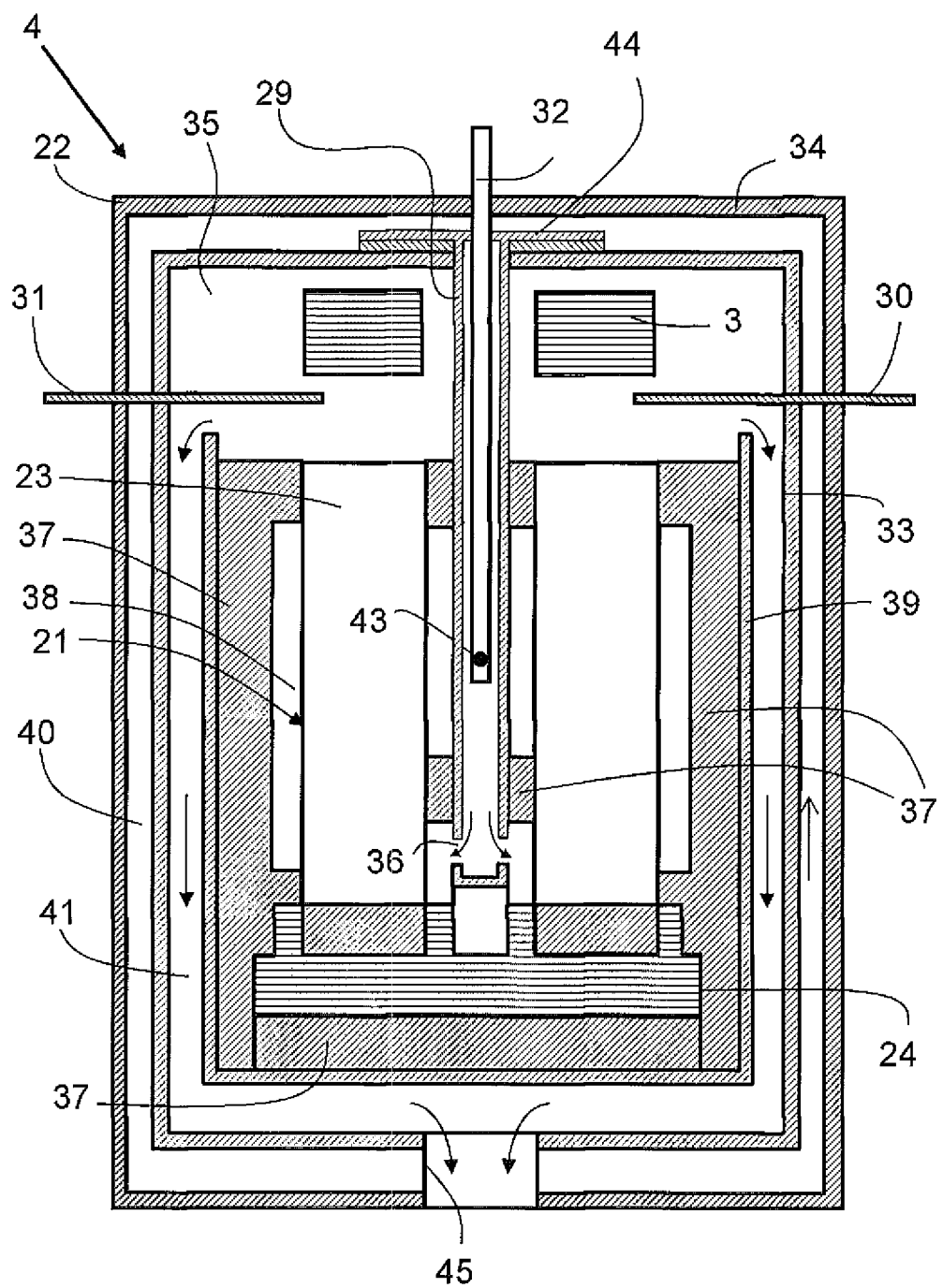
Figure 4:
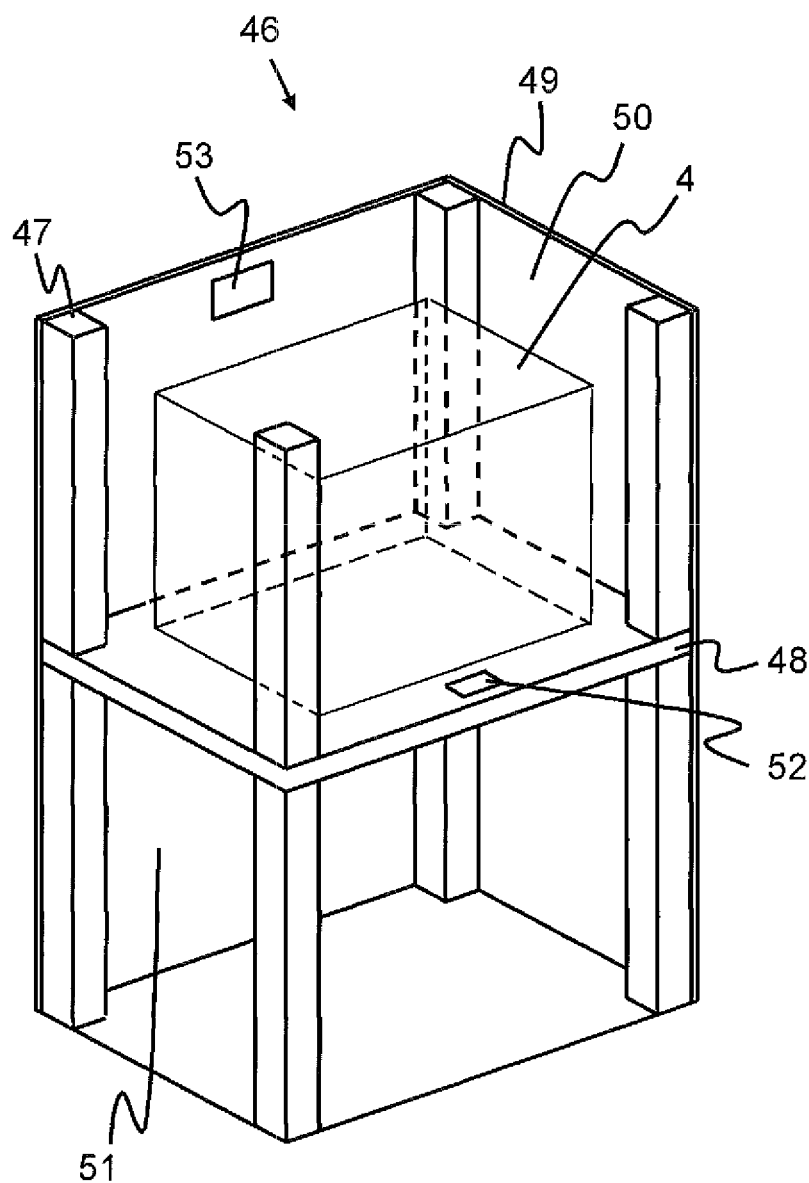

Further, the power generating unit shown in FIG. 1 includes in addition to, as auxiliaries, a power conditioner (supply power adjusting section) 6, a ventilation fan (not shown) of the power conditioner 6, the pump (not shown) of the raw fuel supplying device 1, and the blower (not shown) of the oxygen containing gas supplying device 2, for example, a controlling device 7, various sensors in the storage container 22, a circulation pump 17 that circulates water in the circulation pipe 15, a ventilation fan (not shown) that is provided at an exhaust opening 53 in an exterior plate 49 of a fuel cell device 46 (described later) shown in FIG. 4, an outlet water temperature sensor 14, and ignition devices (described later).

The power conditioner 6 converts direct current power that has been generated at the module 4 into alternating current power, and adjusts the amount of converted power to be supplied to an external load. The outlet water temperature sensor 14 is provided at an outlet of the heat exchanger 8 and measures the temperature of water (circulating water flow) that flows through the outlet of the heat exchanger 8.

The power generating unit surrounded by the alternate long and short dashed line is accommodated in an exterior case. Of the power generating unit whose range is surrounded by the alternate long and short dashed lines, components excluding those components in the range surrounded by the alternate long and two short dashes line are accommodated as auxiliaries in the exterior case (described later), so that the fuel cell device 46 that is, for example, easily set and carried around can be formed. As shown in FIG. 1, the fuel cell device 46 includes a storage battery B. The storage battery B is formed of at least one of an on-vehicle battery, a secondary battery, a dry battery, etc. In particular, it is desirable that a small, inexpensive dry battery be used.

The storage battery B is connected to the controlling device 7. When the fuel cell device that is not operating is to be started up at the time of power failure of a system power supply, the controlling device 7 determines whether or not each of the auxiliaries is an auxiliary necessary for the startup of the fuel cell device or an auxiliary unnecessary for the startup, and performs control so as to supply power from the storage battery B to the auxiliaries necessary for the startup. That is, the controlling device 7 is connected to an auxiliary power switching unit 57 that performs an ON/OFF switching operation to supply or not to supply power to the auxiliaries from the storage battery B.

The controlling device 7 controls the auxiliary power switching unit 57 so that the power from the storage battery B is supplied to only the auxiliaries that have been determined as requiring power supply by the controlling device 7. The auxiliary power switching unit 57 is formed of, for example, a field effect transistor (FET).

FIGS. 2 and 3 each show a form of the module 4 of the fuel cell device. FIG. 2 is an external perspective view of the module 4. FIG. 3 is a sectional view of the module 4 shown in FIG. 2.

In the module 4 shown in FIG. 2, a cell stack device 21 is accommodated in the storage container 22. The cell stack device 21 includes two cell stacks 5, each being formed by securing lower ends of a plurality of columnar fuel cells 23 to a gas tank 24 with an insulating joining material (not shown) such as a glass sealing material. In each cell stack 5, the fuel cells 23 are arranged in a row while disposed in a standing manner, and adjacent fuel cells 23 are electrically connected in series via a power collecting member (not shown). The fuel cells 23 include a gas flow path (not shown) in internal portions thereof for allowing fuel gas to flow therethrough.

Conductive members (not shown), each including a current deriving section, for collecting electricity generated by the power generation of the cell stacks 5 and allowing it to be derived at the outside are disposed on both end portions of each cell stack 5. Although FIG. 2 shows the case in which the cell stack device 21 includes two cell stacks 5, it is possible to change the number of cell stacks as appropriate. For example, the cell stack 21 may include only one cell stack 5.

The storage container 22 is provided with a manually operated second ignition device 30 and an electrically operated first ignition device 31 for burning fuel gas that has passed the fuel cells 23 (described later), and with a thermocouple 32 for measuring the temperature of the interior of the module 4.

In FIG. 2, the fuel cells 23 are exemplified as fuel cells 23 that are each a hollow plate type including a gas flow path for allowing fuel gas to flow through the interior thereof in a longitudinal direction and are each of a solid oxide type in which a fuel electrode layer, a solid electrolyte layer, and an oxygen electrode layer are stacked upon each other in that order on a surface of a support including a gas flow path. The fuel cells 23 may include a gas flow path that allows an oxygen containing gas to flow through the interior thereof in the longitudinal direction. In this case, the structure of the module 4 may be changed as appropriate by providing from an inner side thereof the oxygen electrode layer, the solid electrolyte layer, and the fuel electrode layer. Further, each fuel cell 23 is not limited to a hollow plate type. Each fuel cell 23 may be, for example, a plate type or a cylindrical type. Along with this, it is desirable that the shape of the storage container 22 be changed as appropriate.

In the module 4 shown in FIG. 2, in order to obtain fuel gas that is used for power generation at the fuel cells 23, the reforming unit 3 is disposed above the cell stacks 5. A raw fuel, such as a town gas, is supplied to the reforming unit 3 via a raw fuel supply tube 28, and the raw fuel is reformed to generate a fuel gas including hydrogen gas.

The reforming unit 3 may have a structure that allows it to perform steam reforming, which is an efficient reforming reaction, and partial oxidation reforming. The reforming unit 3 includes a vaporizing section 26 for vaporizing water and a reforming section 25 in which a reforming catalyst (not shown) for reforming a raw fuel into a fuel gas is provided.

As the reforming catalyst, a combustion catalyst that also allows partial oxidation reforming in addition to steam reforming may be used.

As shown in FIG. 2, the fuel gas (hydrogen containing gas) generated at the reforming unit 3 is supplied to the gas tank 24 via a fuel gas flow tube 27, and is supplied to the gas flow path, provided in the fuel cells 23, from the gas tank 24. The structure of the cell stack device 21 may be changed as appropriate in accordance with the type and shape of each fuel cell 23. For example, the reforming unit 3 may be included in the cell stack device 21.

FIG. 2 shows a state in which portions (front and back sides) of the storage container 22 are removed and the cell stack device 21 in the interior thereof is rearwardly removed. Here, in the module 4 shown in FIG. 2, it is possible to slide the cell stack device 21 into the storage container 22 and accommodate it.

A reaction gas introducing member 29 for supplying an oxygen containing gas (reaction gas), such as air, so as to flow along a side of each fuel cell 23 from a lower end portion to an upper end portion is disposed in the storage container 22. The reaction gas introducing member 29 is disposed between the cell stacks 5 disposed side by side at the gas tank 24.

As shown in FIG. 3, the storage container 22 constituting the module 4 has a double structure including an inner wall 33 and an outer wall 34, with the outer wall 34 forming an outer frame of the storage container 22 and the inner wall 33 forming a generator room 35 that accommodates the cell stack device 21. Further, in the storage container 22, a space between the inner wall 33 and the outer wall 34 is defined as a reaction gas flow path 40 through which an oxygen containing gas that is introduced to each fuel cell 23 flows.

Here, the reaction gas introducing member 29 is inserted through the inner wall 33 and secured in the storage container 22. The reaction gas introducing member 29 includes, from an upper portion of the storage container 22, an oxygen containing gas flow-in opening (not shown), used for allowing an oxygen containing gas to flow in, and a flange 44 at an upper end side and a reaction gas flow-out opening 36, used for introducing oxygen containing gas to a lower end portion of each fuel cell 23, at a lower end portion.

In FIG. 3, the reaction gas introducing member 29 that introduces a reaction gas, such as air, into the storage container 22 is disposed so as to be positioned between the two cell stacks 5 disposed side by side in the storage container 22. However, the reaction gas introducing member 29 may be disposed as appropriate in accordance with the number of cell stacks 5. For example, in the case where only one cell stack 5 is to be accommodated in the storage container 22, it is possible to provide two reaction gas introducing members 29 and dispose them on both sides of the cell stack 5.

A heat insulating member 37 for maintaining the temperature in the module 4 at a high temperature so as not to reduce the amount of power that is generated due to a reduction in the temperature of the fuel cells (cell stacks 5) caused by extreme dissipation of heat in the module 4 is provided as appropriate in the generator room 35.

It is desirable to dispose the heat insulating member 37 near the cell stacks 5. In particular, it is desirable that the heat insulating member 37 be disposed adjacent to a side surface of each cell stack 5 in the direction of arrangement of the fuel cells 23 and have a width that is larger than or equal to the width of the side surfaces of each cell stack 5 in the direction of arrangement of the fuel cells 23.

It is desirable that the heat insulating member 37 be disposed on both sides of the cell stacks 5. This makes it possible to effectively suppress a reduction in the temperatures of the cell stacks 5. Further, it is possible to suppress emission from the side surfaces of the cell stacks 5 an oxygen containing gas that is introduced by the reaction gas introducing member 29, so that it is possible to accelerate the flow of the oxygen containing gas between the fuel cells 23 that constitute each cell stack 5.

An opening 38 for adjusting the flow of oxygen containing gas that is supplied to the fuel cells 23 and reducing the temperature distribution in the longitudinal direction of the cell stacks 5 and a stacking direction of the fuel cells 23 is provided in the heat insulating member 37 on both sides of the cell stacks 5. The opening 38 may be formed by combining a plurality of the heat insulating members 37.

An exhaust gas inner wall 39 is provided at the inner side of the inner wall 33 extending along the direction of arrangement of the fuel cells 23. A space between the inner wall 33 and the exhaust gas inner wall 39 is defined as an exhaust gas flow path 41 through which an exhaust gas in the generator room 35 flows downward from an upper side. The exhaust gas flow path 41 is connected to an exhaust hole 45 in a bottom portion of the storage container 22.

By this, the exhaust gas that is generated by the operation of the module 4 flows through the exhaust gas flow path 41, after which it is exhausted from the exhaust hole 45. The exhaust hole 45 may be formed by cutting away a portion of the bottom portion of the storage container 22, or by forming a tubular member.

Here, in the module 4, the manually operated second ignition device 30 and the electrically operated first ignition device 31 for burning fuel gas that has passed the fuel cells 23 (described later) are inserted into the corresponding side surfaces of the storage container 2 so that they are positioned between the reforming unit 3 and each fuel cell 23.

In the fuel cells of a solid oxide type, since the temperature at which the fuel cells 23 are capable of generating power is high, it is necessary to raise the temperature of the module 4 to a high temperature in a startup step of starting up the fuel cell device, and to maintain the module 4 at the high temperature in an ordinary operation step of the fuel cell device. Here, in the fuel cell device shown in FIGS. 2 and 3, when the ignition devices are operated and the fuel gas that has passed the fuel cells 23 is burnt, it is possible to increase the temperature of the module 4 and to, thereby, start up the fuel cell device. Along with this, it is possible to also increase the temperature of the reforming unit 3.

In the interior of the reaction gas introducing member 29, the thermocouple 32 for measuring the temperature of the vicinity of each cell stack 5 is disposed and a temperature measuring section 43 of the thermocouple 32 is disposed at a central portion of the fuel cells 23 in the longitudinal direction thereof and at a central portion of the fuel cells 23 in the direction of arrangement of the fuel cells 23.

FIG. 4 is an exploded perspective schematic view of an exemplary fuel cell device according to the embodiment, with a portion of its structure not being shown.

In the fuel cell device 46 shown in FIG. 4, the interior of the exterior case, formed by supporting columns 47 and exterior plates 49, are divided into an upper portion and a lower portion by a partition plate 48, with the upper side being formed as a module accommodation chamber 50 that accommodates the above-described module 4 and the lower side being formed as an auxiliary accommodation chamber 51 that accommodates auxiliaries for causing the module 4 to operate. In FIG. 4, the auxiliaries in the auxiliary accommodation chamber 51 are not shown. However, in the structure shown in FIG. 1, various devices (auxiliaries) such as the water pump 12, serving as a water supplying device, the water tank 11, the power conditioner (supply power adjusting section) 6, the controlling device 7, the circulation pump 17, and the condensed water treatment device 9 are accommodated in the auxiliary accommodation chamber 51.

An air circulation opening 52 for allowing air in the auxiliary accommodation chamber 51 to flow towards the module accommodation chamber 50 is formed in the partition plate 48. The exhaust opening 53 for exhausting the air in the module accommodation chamber 50 is formed in a portion of the exterior plate 49 of the module accommodation chamber 50. A ventilation fan (not shown) is provided at the exhaust opening 53.

In the embodiment, in accordance with the state of the fuel cell device and depending on the case, the controlling device 7 determines whether or not each of the auxiliaries is an auxiliary necessary for startup or an auxiliary unnecessary for the startup; controls the auxiliary power switching unit 57 so as to supply power to the auxiliaries necessary for the startup; and, when the fuel cell device that is not operating is to be started up at the time of power failure of the system power supply, causes power to be supplied from the storage battery B to the minimum number of auxiliaries necessary for the startup among the plurality of auxiliaries.

In other words, the controlling device 7 is programmed so that, when power of the storage battery B is supplied to the controlling device 7, in accordance with the state of the fuel cell device and depending upon the case, the controlling device 7 determines auxiliaries necessary for the startup and auxiliaries unnecessary for the startup; and, in accordance with the determination, the controlling device 7 controls the auxiliary power switching unit 57 and causes the power from the storage battery B to be supplied to some of the auxiliaries necessary for the startup among the plurality of auxiliaries during the startup at the time of power failure of the system power supply from the state in which the fuel device is not operating. This makes it possible to reduce the power required during the startup, reduce the size of the storage battery B, and form the storage battery B that is formed of, for example, an inexpensive dry battery.

"At the time of power failure of the system power supply" means "a state in which power supply from an electric power company to the fuel cell system is stopped. Examples thereof include a case in which power supply to the fuel cell system is stopped when power lines are damaged due to, for example, natural disasters; a case in which power supply to the fuel cell system is stopped due to, for example, breakage of a wire connected to the fuel cell system in each home; and a case in which power supply to the fuel cell system is stopped when a circuit breaker disposed in each home cuts off the power.

"The fuel cell device that is not operating is to be started up at the time of power failure of the system power supply" also includes the case in which the fuel cell device is to be restarted after stoppage of the fuel cell device that had been temporarily generating power. That is, a case in which the fuel cell device is to be restarted from the state in which the operation of each fuel cell is stopped when the supply of fuel gas to each fuel cell has been stopped and power supply to a load has been stopped is also included.

In the fuel cell device according to the embodiment, the step up to when startup is started by pressing a start switch and power supply to loads (including auxiliaries) is started is called the startup step, the step from a state in which the power supply to the loads is started to when supply of fuel gas to each fuel cell is stopped and the power supply to the loads is stopped is called the ordinary operation step, and the steps subsequent to the ordinary operation step are called non-operation steps.

In the startup step at the time of power failure, at least a raw fuel and an oxygen containing gas are required. Therefore, the minimum required auxiliaries are, for example, the controlling device 7, the pump of the raw fuel supplying device 1, and the blower of the oxygen containing gas supplying device 2.

Regarding these auxiliaries, as mentioned later, when the raw fuel is manually supplied without supplying the raw fuel using the electrically operated pump, the electrically operated pump of the raw fuel supplying device 1 becomes unnecessary as an auxiliary in the startup step; when the reforming reaction at the reforming unit 3 is to be a partial oxidation reforming reaction that does not use water, the electrically operated water pump 12 becomes unnecessary as an auxiliary in the startup step; and when an oxygen containing gas is supplied with, for example, a manually operated air pump without supplying the oxygen containing gas with the electrically operated blower, the electrically operated blower of the oxygen containing gas supplying device 2 becomes unnecessary as an auxiliary in the startup step.

From the viewpoint of reducing the size and cost of the fuel cell device, the fuel cell device does not ordinarily include manually operated devices for supplying a raw fuel and an oxygen containing gas, so that, as the minimum required auxiliaries in the startup step at the time of power failure, the controlling device 7, the electrically operated pump of the raw fuel supplying device 1, and the electrically operated blower of the oxygen containing gas supplying device 2 are ordinarily provided.

Each of the aforementioned auxiliary is successively described below.

During startup at the time of power failure of the system power supply, the controlling device 7 determines that the power conditioner 6 is an auxiliary that is unnecessary for the startup. That is, during the startup at the time of power failure of the system power supply, it is desirable that the controlling device 7 control the auxiliary power switching unit 57 so as not to supply power to the power conditioner 6 serving as an auxiliary. Since, in the startup step, power is not generated, the power conditioner 6 used for conversion into alternating current is not required. By stopping power supply to the power conditioner 6, it is possible to reduce the power that is required during the startup, and to reduce the size and cost of the storage battery B.

In the ordinary operation step, the power conditioner 6 provides, for example, the function of detecting power failure in addition to the function of converting direct current into alternating current and the function of adjusting the amount that is supplied to an external load; and supplies power. In contrast, during the startup, it is not necessary to convert direct current into alternating current and supply power to a load. Therefore, until the startup step ends, power restoration is not detected, a power failure display is considered permissible even if power is restored, and the power supply to the power conditioner 6 is stopped, so that power that is required in the startup step is reduced. The controlling device 7 also determines that the ventilation fan for the power conditioner 6 is an auxiliary unnecessary for the startup.

That is, during the startup at the time of power failure of the system power supply, first, the power supply source switching unit SW for power-supply-source switching between the system power supply and the storage battery B is switched, to supply power from the storage battery B to the controlling device 7. The switching operation of the power supply source switching unit SW is ordinarily performed manually. The power supply source switching unit SW is capable of switching the power supply source from the storage battery B to the fuel cells. When the step changes from the startup step to the ordinary operation step, the controlling device 7 controls the power supply source switching unit SW, switches the power supply source from the storage battery B to the fuel cells, and performs control to supply generated power from the fuel cells to, for example, the auxiliaries.

Next, during the startup at the time of power failure of the system power supply, the controlling device 7 determines that the electrically operated pump, which corresponds to the raw fuel supplying device 1, and the electrically operated blower, which corresponds to the oxygen containing gas supplying device 2, are auxiliaries necessary for fuel cell startup; controls the auxiliary power switching unit 57 so that the power from the storage battery B is supplied to the electrically operated pump, which corresponds to the raw fuel supplying device 1, and the electrically operated blower, which corresponds to the oxygen containing gas supplying device 2; and causes the raw fuel supplying device 1 and the oxygen containing gas supplying device 2 to be operated.

Here, as a device that supplies a raw fuel, as mentioned above, it is possible to provide a manually operated (second) supplying device separately from the electrically operated (first) pump of the raw fuel supplying device. It is possible to use, for example, a cassette cylinder, a portable propane gas cylinder, or a hydrogen cylinder. When a hydrogen cylinder is used, it is possible to supply a raw fuel directly to the cell stacks 5 without passing it through the reforming unit 3. This makes it unnecessary to provide power required for driving the electrically operated pump of the raw fuel supplying device 1.

It is possible to provide a manually operated (second) supplying device separately from the electrically operated (first) blower of the oxygen containing gas supplying device 2. It is possible to use, for example, a spring pump, a bag body pump, a vibration pump, or a cylinder filled with an oxygen containing gas. This makes it unnecessary to provide power required for driving the electrically operated blower of the oxygen containing gas supplying device 2.

Even regarding the circulation pump 17 that circulates water in the circulation pipe 15, in the startup step, the exhaust gas temperature is generally low. Therefore, when the temperature of the exhaust gas that is exhausted from the module 4 is larger than or equal to a predetermined temperature, the controlling device 7 determines that the circulation pump 17 is an auxiliary necessary for the startup, and performs control to supply power used to operate the circulation pump 17 from the storage battery B.

In the startup step, the circulation pump 17 that circulates water in the circulation pipe 15 does not need to be operated to that extent. Therefore, it is desirable that the controlling device 7 control the power supply from the storage battery B so as to minimize the operation of the circulation pump 17 or stop the circulation pump 17. This makes it possible to further reduce power that is required during the startup at the time of power failure of the system power supply, and to reduce the size of the storage battery B.

The circulation pump 17 is driven so as not to cause a user to feel uneasy when high-temperature water vapor becomes white smoke by ejection of the water vapor to the outside. However, it is possible to consider as inevitable the generation of white smoke during the time required for the startup when a power failure occurs, and to stop the circulation pump 17 for reducing power consumption. In the startup step, the temperature of the exhaust gas is ordinarily not high. Therefore, in the startup step, the circulation pump 17 need not be operated to that extent, and the controlling device 7 ordinarily determines that the circulation pump 17 is an auxiliary that is not required in the startup step. Since the power consumption of the circulation pump 17 is high, it is desirable that the circulation pump 17 be an auxiliary that is not required in the startup step at the time of power failure.

For example, during startup in a short time from when the fuel cell device has been stopped, the temperature of the exhaust gas that is exhausted from the module 4 may be larger than or equal to a predetermined temperature, for example, larger than or equal to 90° C. In addition, the temperature of the exhaust gas that is exhausted from the module 4 may be larger than or equal to a predetermined temperature, for example, larger than or equal to 90° C. after the passage of time from the start of the startup. In these cases, the controlling device 7 determines that the circulation pump 17 is an auxiliary necessary for the startup and performs control to supply power used for operating the circulation pump 17 from the storage battery B.

In this case, it is desirable that the circulation pump 17 be operated by the minimum power required for operating the circulation pump 17. This makes it possible to reduce the power that is required in the startup and to reduce the size of the storage battery B and form the storage battery B using an inexpensive dry battery. The module 4 includes the temperature sensor 32, formed of, for example, the thermocouple, that measures exhaust gas temperature. Although, in the aforementioned case, power is also supplied to the temperature sensor that measures exhaust gas temperature, the power consumption of the sensor itself is low.

The ventilation fan at the exhaust opening 53 in the exterior plate 49 of the fuel cell device 46 shown in FIG. 4 is ordinarily not required in the startup step because the temperature in the fuel cell device 46 is low, as a result of which it is ordinarily determined that the ventilation fan is an auxiliary unnecessary for the startup. Since the power consumption of the ventilation fan is high, it is desirable that the ventilation fan be an auxiliary that is not required in the startup step at the time of power failure.

When the fuel cell device is restarted in a short time from when the fuel cell device has been stopped, the temperature in the fuel cell device may be larger than or equal to a predetermined temperature, for example, larger than or equal to 40° C. In addition, the temperature in the fuel cell device may be larger than or equal to a predetermined temperature, for example, larger than or equal to 40° C. after the passage of time from the start of the startup. In these cases, the controlling device 7 determines that the ventilation fan is an auxiliary necessary for the startup and controls the auxiliary power switching unit 57 so as to supply power used for operating the ventilation fan from the storage battery B.

In this case, it is desirable that the ventilation fan be operated by the minimum power required for operating the ventilation fan. This makes it possible to reduce the power that is required in the startup step and to reduce the size of the storage battery B and form the storage battery B using an inexpensive dry cell.

For example, it is desirable that, ordinarily, the ventilation fan be driven so that the surface temperature of the exterior case does not become too high, that is, under the law, becomes less than or equal to 60° C., particularly, less than or equal to 40° C. In contrast, even if, in the power failure step, the surface temperature of the exterior case becomes larger than equal to 40° C., in the case where the surface temperature is less than or equal to 60° C., it is considered permissible for the surface temperature of the exterior case to be somewhat high and durability of the auxiliary to be reduced, and the ventilation fan is minimally operated or is stopped, thereby reducing the power required in the startup. Therefore, it is possible to use the surface temperature of the exterior case as the temperature of the fuel cell device and to control the operation of the ventilation fan on the basis of the surface temperature of the exterior case. The surface temperature of the exterior case refers to the temperature of the outer surface of the exterior plates constituting the exterior case. The surface temperature of the exterior case can be detected with the temperature sensor at the exterior plate.

From the viewpoint of safety and environmental viewpoint, it is not desirable that fuel gas that has passed the fuel cells 23 be emitted as it is to the outside of the fuel cell device. Therefore, the fuel cell device shown in FIGS. 2 and 3 is provided with the electrically operated first ignition device 31 and the manually operated second ignition device 30 for exhausting the fuel gas to the outside of the fuel cell device after burning the fuel gas that has passed the fuel cells 23. By the startup using the manually operated second ignition device 30 at the time of power failure of the system power supply, it is possible to reduce the power that is required in the startup step.

However, since, as mentioned above, at the time of power failure, power is not supplied from the system power supply, the electrically operated ignition device (the first ignition device 31 in the embodiment) cannot be operated. Therefore, in the fuel cells of the solid oxide type, it becomes difficult to raise the temperature of the module 4, and it may be difficult to start up the fuel cell device.

Consequently, it is desirable that the fuel cell device according to the embodiment include the manually operated second ignition device 30. Thus, at the time of power failure, even if the system power supply does not supply power, the manually operated second ignition device 30 is operated to burn the fuel gas that has passed the fuel cells 23. This makes it possible to mitigate the problem from the viewpoint of safety and environmental viewpoint, and to raise the temperature of the module 4 and to efficiently start up the fuel cell device. As the manually operated second ignition device 30, it is possible to use, for example, lighters like firing rods.

By providing the electrically operated first ignition device 31 along with the manually operated second ignition device 30, the electrically operated first ignition device 31 is used for ignition in the ordinary operation step and the manually operated second ignition device 30 is used for ignition in the startup step at the time of power failure. This makes it possible to efficiently burn the fuel gas that has passed the fuel cells 23.

Here, the startup step and the ordinary operation step of the fuel cell device shown in FIG. 1 are described. When there is a supply of power from the system power supply, at the time of startup, the power is supplied from the system power supply using the power supply source switching unit SW. First, the electrically operated pump, which corresponds to the raw fuel supplying device 1, and the electrically operated blower, which corresponds to the oxygen containing gas supplying device 2, are operated. At this time, the temperature of the module 4 is low, so that power is not generated at the fuel cells 23 and reforming reaction does not occur at the reforming unit 3. The auxiliary power switching unit is controlled so that the power is supplied to all of the auxiliaries.

Next, the first ignition device 31 at the module 4 is operated. This causes a fuel gas that has been supplied by the pump of the raw fuel supplying device 1 and that has passed the fuel cells 23 to burn. Combustion heat thereof raises the temperature of the module 4 and the reforming unit 3. If the temperature of the reforming unit 3 becomes a temperature allowing steam reforming, the water pump 12, which is a water supplying device, is operated to supply water to the reforming unit 3. This causes a fuel gas, which is a hydrogen containing gas, necessary for power generation at the fuel cells 23 to be generated at the reforming unit 3. When the temperature of the fuel cells 23 becomes a temperature that allows power generation to be started, the fuel cells 23 start generating power using the fuel gas generated at the reforming unit 3 and oxygen containing gas that is supplied by the oxygen containing gas supplying device 2.

Here, the startup step of the fuel cell device is completed and the process switches to the ordinary operation step. The power generated at each cell stack 5 is converted into alternating current by the power conditioner 6, after which, in accordance with the requirement of an external load, the controlling device 7 controls the supply to the external load, and controls the power supply source switching unit SW so that power supply from each cell stack 5 to the auxiliaries is performed instead of the power supply from the system power supply.

The controlling device 7 controls the operation of the electrically operated blower, which corresponds to the oxygen containing gas supplying device 2, so that an oxygen containing gas required in accordance with the amount of power that is generated at the cell stacks 5 is supplied. Along with this, the controlling device 7 controls the operation of the electrically operated pump, which corresponds to the raw fuel supplying device 1, so that a fuel gas that is required in accordance with the amount of power that is generated at the cell stacks 5 is generated at the reforming unit 3; and controls the operation of the electrically operated water pump 12, which is a water supplying device.

Exhaust gas generated by the operation of each cell stack 5 is supplied to the heat exchanger 8, and heat exchange is performed with the water that flows through the circulation pipe 15. Hot water that is produced by the heat exchange at the heat exchanger 8 flows through the circulation pipe 15 and is stored in the hot water storage tank 16. Water in the exhaust gas that is exhausted by the cell stacks 5 becomes condensed water by the heat exchange at the heat exchanger 8 and is supplied to the condensed water treatment device 9 via the condensed water supply pipe 10. The condensed water becomes pure water at the condensed water treatment device 9, and is supplied to the water tank 11. The water stored in the water tank 11 is supplied to the reforming unit 3 via the water supply pipe 13 by the electrically operated water pump 12, which is a water supplying device. By effectively using the condensed water in this way, it is possible to perform a self-sustaining operation.

The fuel cell device may stop due to, for example, power failure of the system power supply, that is, stoppage of power supply from an electric power company, due to natural disasters, such as earthquakes and typhoons. In addition, one may want to start up the fuel cell device at the time of power failure of the system power supply.

However, for example, at the time of power failure of the system power supply, there is no power supply from an electric power company, as a result of which the operations of various auxiliaries, such as the aforementioned raw fuel supplying device 1, oxygen containing gas supplying device 2, electrically operated pump, which is a water supplying device, blower, water pump 12, and controlling device 7, are stopped. Therefore, it is no longer possible to operate the power generating unit serving as the fuel cell device.

Consequently, the fuel cell device according to the embodiment includes the separately provided storage battery B. During the startup at the time of power failure of the system power supply, the controlling device 7 determines whether or not each of the auxiliaries is an auxiliary necessary for the startup of the fuel cells or an auxiliary unnecessary for the startup, and performs control so that power is supplied from the storage battery 8 to the auxiliaries necessary for the startup.

That is, during startup at the time of power failure of the system power supply, first, using the power supply source switching unit SW, switching is performed between the power supply from the fuel cells, the system power supply, and the storage battery B, to supply power from the storage battery B to the controlling device 7. The power supply source switching unit SW switches from the fuel cells or the system power supply to the storage battery B, which switching is ordinarily manually performed. Next, the controlling device 7 distinguishes that the electrically operated pump, which corresponds to the raw fuel supplying device 1, and the electrically operated blower, which corresponds to the oxygen containing gas supplying device 2, are auxiliaries necessary for the startup of the fuel cells; controls the auxiliary power switching unit 57 so that the power from the storage battery B is supplied to the electrically operated pump, which corresponds to the raw fuel supplying device 1, and the electrically operated blower, which corresponds to the oxygen containing gas supplying device 2; and causes the raw fuel supplying device 1 and the oxygen containing gas supplying device 2 to be operated.

Here, as a device that supplies raw fuel, as mentioned above, it is possible to provide a manually operated (second) supplying device separately from the electrically operated (first) pump of the raw fuel supplying device 1. By using such a manually operated supplying device, it is possible to eliminate the need for power required for driving the electrically operated pump of the raw fuel supplying device 1.

It is possible to provide the manually operated (second) supplying device separately from the electrically operated (first) blower of the oxygen containing gas supplying device 2. By using such a manually operated supplying device, it is possible to eliminate the need for power required for driving the electrically operated blower, which is the oxygen containing gas supplying device 2.

Next, the controlling device 7 determines that the first electrically operated ignition device 31 of the module 4 is an auxiliary necessary for the startup of the fuel cells, and power is supplied from the storage battery B to operate it. This causes the fuel gas that has been supplied from the raw fuel supplying device 1 and that has passed the fuel cells 23 to burn. Combustion heat thereof raises the temperature of the module 4 and the reforming unit 3.

If the temperature of the reforming unit 3 becomes a temperature allowing steam reforming, the controlling device 7 determines that the water pump 12, which is a water supplying device, is an auxiliary necessary for the startup of the fuel cells, and power is supplied from the storage battery B to the water pump 12, to operate the water pump 12 and supply water to the reforming unit 3. This causes a fuel gas, which is a hydrogen containing gas, necessary for power generation at the fuel cells 23 to be generated at the reforming unit 3. When the temperature of the fuel cells 23 becomes a temperature that allows power generation to be started, the fuel cells 23 start generating power using the fuel gas generated at the reforming unit 3 and oxygen containing gas that is supplied by the oxygen containing gas supplying device 2. The step proceeds from the startup step to the ordinary operation step.

The power generating unit shown in FIG. 1 includes the valve 20 for adjusting the flow amount of the oxygen containing gas so that, in the startup step, the oxygen containing gas that is supplied from the oxygen containing gas supplying device 2 can be supplied to the reforming unit 3 and the module 4. When, as a result of this, the temperature of the reforming unit 3 becomes a temperature that allows partial oxidation reforming, the valve 20 operates and the oxygen containing gas is supplied to the reforming unit 3 to perform partial oxidation reforming. This makes it possible to generate a fuel gas including a hydrogen containing gas that is supplied to the cell stacks 5.

If, in the startup step, the raw fuel that is supplied from the raw fuel supplying device 1 needs to be reformed at the reforming unit 3 when there is no power supply from the system power supply, since the operation of the pump 12, which is a water supplying device, is also stopped, it is desirable that the fuel gas, which is a hydrogen containing gas, that is supplied to the cell stacks 5 be generated by performing partial oxidation reforming at the reforming unit 3. Here, in the embodiment, by manually adjusting the valve 20, it is possible to supply the oxygen containing gas that is supplied from the oxygen containing gas supplying device 2 to the reforming unit 3 and the module 4 and to eliminate driving power of the water pump. In this case, the valve 20 and a pipe that connects the valve 20 and the reforming unit 3 correspond to a third oxygen containing gas supplying device that supplies an oxygen containing gas to the reforming unit 3. It is also possible to provide at the reforming unit a third oxygen containing gas supplying device that is completely separate from the oxygen containing gas supplying device 2.

At the beginning of the startup, it is possible to supply power from the storage battery B to the controlling device 7 and various sensors that measure, for example, the temperature of respective parts; self-diagnose the state of the fuel cell device by the controlling device 7 on the basis of information from the various sensors; and determine auxiliaries necessary for the startup of the fuel cells and auxiliaries unnecessary for the startup by the controlling device 7.

During the startup at the time of power failure of the system power supply, it is desirable that the amount of oxygen containing gas that is supplied by the oxygen containing gas supplying device 2 be small from the viewpoint of saving power. In addition, when the amount of raw fuel that is supplied to the reforming unit 3 is made larger than that during the ordinary operation, it is possible to raise the temperature in the interior of the fuel cell device in a short time and to quicken the startup.

It is desirable that the power generation start temperature at each cell stack 5 during the startup using the storage battery B be set lower than the power generation start temperature during the startup using the system power supply (during the ordinary case) and generated power be supplied to auxiliaries. In other words, if, during the startup at the time of power failure of the system power supply, the temperature of the fuel cells (in the interior of the module 4) reaches a temperature at which driving power of some of the auxiliaries necessary for the startup is obtained (a temperature that is lower than the power generation start temperature during the ordinary case), it is desirable that the controlling device 7 control the power supply source switching unit SW and switching be performed to power supply from the fuel cells from power supply from the storage battery B. This makes it possible to reduce the power that is stored at the storage battery B and reduce the size of the storage battery B. That is, if the temperature in the interior of the module 4 reaches a temperature at which power that can be supplied to auxiliaries is generated, the step proceeds from the startup step to the ordinary operation step, power generation is started, power is supplied to the auxiliaries, and the supply of power from the storage battery B is stopped. For example, in the case where, during the startup using the system power supply, the starting of power generation is at 600° C. and the power generation is performed at 200 W, the starting of power generation is at 500° C. and the power generation is performed at 100 W during the startup using the storage battery B at the time of power failure. The power of 100 W is supplied to the auxiliaries. This makes it possible to reduce the storage amount of the storage battery B and to reduce the size of the storage battery B. Since, at the initial stage of the ordinary operation step, the amount of power generated is small, power is supplied to only some of the auxiliaries from the fuel cells and power is supplied from the storage battery B to the other auxiliaries.

When a dry battery is used as the storage battery B, it is possible to adjust an output voltage of the storage battery B, which is formed of a dry battery, to a voltage required for the auxiliaries. If the voltage of the storage battery B, which is formed of a dry battery, is low, it is desirable to increase an output command value (output duty) to, for example, a pump and ensure the power of the pump.

It is desirable that, first, after the power generated at the cell stacks 5 has been applied to the auxiliary power switching unit 57, which switches the power supply to each auxiliary, via the power supply source switching unit SW, the power generated at the cell stacks 5 be applied to, for example, the raw fuel supplying device 1, the oxygen containing gas supplying device 2, and the water pump 12 (which is a water supplying device), which are various auxiliaries.

Although, the aforementioned embodiment is described in detail, the embodiment is not limited to the above-described exemplary forms. Various changes, modifications, etc., can be made within a scope that does not depart from the gist of the embodiment.

For example, although the controlling device 7 and the auxiliary power switching unit 57 are shown as separate members in FIG. 1, in the present invention, the controlling device and the auxiliary power switching unit may be integrated to each other.

REFERENCE SIGNS LIST

1 raw fuel supplying device
2 oxygen containing gas supplying device
3 reforming unit
4 fuel cell module
6 power conditioner
7 controlling device
8 heat exchanger
17 pump
30 first ignition device
31 second ignition device
57 auxiliary power switching unit
B storage battery
SW power supply source switching unit

The invention claimed is:

1. A fuel cell device comprising:
a fuel cell that is connected to a system power supply and that generates power with a fuel gas and an oxygen containing gas;
a plurality of auxiliaries coupled to the fuel cell;
a storage battery;
an auxiliary power switching unit that selectively supplies power to at least one of the plurality of auxiliaries from the storage battery;
a power supply source switching unit that switches between the system power supply or the storage battery and the fuel cell as a power supply source to the auxiliaries; and
a controlling device configured to:
start operation of the fuel cell from a non-operating state;
determine which of the plurality of auxiliaries needs power for startup of the fuel cell;
prompt the auxiliary power switching unit to supply the power from the storage battery to the determined auxiliaries when the controlling device has determined a lack of adequate power from the system power supply; and
control the power supply source switching unit in such a way that a power generation start temperature at the fuel cell during the startup of the fuel cell device using the storage battery is set lower than a power generation start temperature at the fuel cell during the startup of the fuel cell device using the system power supply.

2. The fuel cell device according to claim 1, wherein the one or more auxiliaries for which the controlling device has determined a power need for the startup comprises a ventilation fan and the controlling device is configured to start the ventilation fan if a temperature of the fuel cell is larger than or equal to a predetermined temperature.

3. The fuel cell device according to claim 1, further comprising a heat exchanger that performs heat exchange between water and an exhaust gas that is exhausted from the fuel cell, wherein the one or more auxiliaries for which the controlling device has determined a power need for the startup comprise a pump that supplies the water to the heat exchanger, and the controlling device is configured to start the pump when a temperature of the exhaust gas that is exhausted from the fuel cell is higher than or equal to a predetermined temperature.

4. The fuel cell device according to claim 1, comprising the power supply source switching unit that switches a power supply source for the one or more auxiliaries to either one of the storage battery and the fuel cell, wherein the controlling device is configured to control the power supply source switching unit such that the power supply from the storage battery to the auxiliary that is necessary for the startup is switched to power supply from the fuel cell in a startup process of the fuel cell device at the time of a power failure of the system power supply when an amount of the power generated at the fuel cell becomes larger than or equal to a driving power amount of the auxiliary necessary for the startup.

5. The fuel cell device according to claim 1, further comprising a power conditioner as the auxiliary, wherein the controlling device is configured to determine that the power conditioner is an unnecessary auxiliary for the startup when the fuel cell device in a non-operating state is started up at a time of the power failure of the system power supply.

6. The fuel cell device according to claim 1, further comprising:
a first gas supplying device that electrically drives the supply of oxygen containing gas to the fuel cell; and
a manually operated second gas supplying device that is configured to supply the oxygen containing gas to the fuel cell, wherein the controlling device is configured to determine that the first gas supplying device is an unnecessary auxiliary for the startup when the fuel cell device in a non-operating state is started up at the time of a power failure of the system power supply.

7. The fuel cell device according to claim 1, further comprising:

a reforming unit that performs steam reforming with a raw fuel gas and water vapor and that generates the fuel gas including hydrogen gas;

a water pump coupled to the reforming unit to supply water to the reforming unit; and a gas supplying device coupled to the reforming unit to supply the oxygen containing gas to the reforming unit, wherein the controlling device is configured to determine that the water pump is an unnecessary auxiliary for the startup when the fuel cell device in a non-operating state is started up at the time of a power failure of the system power supply.

8. The fuel cell device according to claim 1, comprising:

a first ignition device that is electrically operated; and a second ignition device that is manually operated, wherein the first and second ignition device are designed to ignite an excessive portion of the fuel gas that has not been used by the fuel cell; and the controlling device is configured to determine that the first ignition device is an unnecessary auxiliary for the startup when the fuel cell device that is in a non-operating state is started up at the time of a power failure of the system power supply.

9. The fuel cell device according to claim 1, wherein the storage battery comprises a plurality of dry batteries that are connected in series.

* * * * *

UNITED STATES PATENT AND TRADEMARK OFFICE
CERTIFICATE OF CORRECTION

Page 1 of 6

| | |
|---|---|
| PATENT NO. | : 9,225,047 B2 |
| APPLICATION NO. | : 14/123060 |
| DATED | : December 29, 2015 |
| INVENTOR(S) | : Eiji Taniguchi |

It is certified that error appears in the above-identified patent and that said Letters Patent is hereby corrected as shown below:

Delete the title page and substitute therefore with the attached title page consisting of the corrected illustrative figure.

In the Drawings

Please replace FIGS. 1-4 with FIGS. 1-4 as shown on the attached pages.

In the Specification

Column 1, between line 63 and 64: Please insert the heading --SUMMARY OF THE INVENTION--.

Signed and Sealed this
Nineteenth Day of July, 2016

Michelle K. Lee
*Director of the United States Patent and Trademark Office*

(12) United States Patent
Taniguchi

(10) Patent No.: US 9,225,047 B2
(45) Date of Patent: Dec. 29, 2015

(54) FUEL CELL DEVICE

(75) Inventor: Eiji Taniguchi, Moriyama (JP)

(73) Assignee: KYOCERA CORPORATION, Kyoto-Shi, Kyoto (JP)

(*) Notice: Subject to any disclaimer, the term of this patent is extended or adjusted under 35 U.S.C. 154(b) by 94 days.

(21) Appl. No.: 14/123,060

(22) PCT Filed: May 30, 2012

(86) PCT No.: PCT/JP2012/064009
§ 371 (c)(1),
(2), (4) Date: Dec. 30, 2013

(87) PCT Pub. No.: WO2012/165516
PCT Pub. Date: Dec. 6, 2012

(65) Prior Publication Data
US 2014/0120382 A1 May 1, 2014

(30) Foreign Application Priority Data
May 30, 2011 (JP) ................. 2011-120655

(51) Int. Cl.
H01M 16/00 (2006.01)
H01M 8/04 (2006.01)
H01M 8/06 (2006.01)

(52) U.S. Cl.
CPC ...... *H01M 16/006* (2013.01); *H01M 8/04014* (2013.01); *H01M 8/04223* (2013.01); *H01M 8/04731* (2013.01); *H01M 8/04955* (2013.01); *H01M 8/04985* (2013.01); *H01M 8/04067* (2013.01); *H01M 8/0618* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2004/0241512 A1* | 12/2004 | Muto et al. | 429/23 |
| 2005/0281735 A1* | 12/2005 | Chellappa et al. | 423/648.1 |
| 2006/0057465 A1* | 3/2006 | Kabasawa | 429/22 |
| 2007/0178361 A1* | 8/2007 | Brantley et al. | 429/38 |
| 2008/0152974 A1* | 6/2008 | Murabayashi | 429/23 |

(Continued)

FOREIGN PATENT DOCUMENTS

| | | |
|---|---|---|
| JP | 6152173 A | 3/1986 |
| JP | 8-148173 | 6/1996 |

(Continued)

OTHER PUBLICATIONS

The European Search Report dated Oct. 24, 2014 issued in the corresponding European patent application No. 12793211.9.

(Continued)

*Primary Examiner* — Patrick Ryan
*Assistant Examiner* — Wyatt McConnell

(57) ABSTRACT

A fuel cell includes a fuel cell, auxiliaries, a storage battery, an auxiliary power switching unit and a controlling device. The fuel cell is connected to a system power supply. The auxiliaries are coupled to the fuel cell. The auxiliary power switching unit switches power supplies to at least one of the auxiliaries from the storage battery. When the fuel cell device that is not operating starts operation at a time of power failure of the system power supply, the controlling device determines whether or not each of the auxiliaries need power for startup of the fuel cell and prompts the auxiliary power switching unit to supply the power from the storage battery to one or more auxiliaries for which the controlling device has determined a power demand for the startup.

9 Claims, 4 Drawing Sheets